United States Patent [19]

Strohmeier et al.

[11] Patent Number: 5,798,044
[45] Date of Patent: Aug. 25, 1998

[54] METHOD FOR SEWAGE TREATMENT

[75] Inventors: Andreas Strohmeier, Leonberg; Ingulf Schroeter, Stuttgart, both of Germany; Jean-Marie Rovel, Rueil-Malmaison, France

[73] Assignee: Philipp Muller GmbH, Stuttgart, Germany

[21] Appl. No.: 513,869

[22] PCT Filed: Mar. 11, 1994

[86] PCT No.: PCT/EP94/00765

§ 371 Date: Sep. 15, 1995

§ 102(e) Date: Sep. 15, 1995

[87] PCT Pub. No.: WO94/21568

PCT Pub. Date: Sep. 29, 1994

[30] Foreign Application Priority Data

Mar. 15, 1993 [DE] Germany ............... 43 08 156.8

[51] Int. Cl.⁶ .................... C02F 3/30; C02F 3/06
[52] U.S. Cl. ............ 210/605; 210/615; 210/903; 210/906
[58] Field of Search .................. 210/605, 615, 210/903, 906, 631, 616, 617

[56] References Cited

U.S. PATENT DOCUMENTS

| | | | |
|---|---|---|---|
| 4,826,601 | 5/1989 | Spratt et al. | 210/610 |
| 5,022,993 | 6/1991 | Williamson | 210/605 |
| 5,344,562 | 9/1994 | Lorenz et al. | 210/903 |
| 5,393,427 | 2/1995 | Barnard | 210/605 |
| 5,480,548 | 1/1996 | Daigger et al. | 210/605 |

FOREIGN PATENT DOCUMENTS

| | | |
|---|---|---|
| 0 247 212 | 12/1987 | European Pat. Off. . |
| 0456607A1 | 11/1991 | European Pat. Off. . |
| 0543457A1 | 5/1993 | European Pat. Off. . |
| 28 24 446 | 12/1979 | Germany . |
| 31 31 989 | 2/1983 | Germany . |
| 31 36 409 | 3/1983 | Germany . |
| 39 16 679 | 11/1990 | Germany . |
| 3933513 A1 | 4/1991 | Germany . |
| WO92/04284 | 3/1992 | WIPO . |

OTHER PUBLICATIONS

Mehrstufige biologische Kläranlagen, Korrespondenz Abwasser, Feb. 1989, pp. 181–189.
Unwandlung und Elimination von Stickstoff im Abwasser Arbeitsbericht der ATV–Fachausschusse 2.6 und 2.8, Korrespondenz Abwasser, Feb. 1987, pp. 167–171.
Restnitrifikation nach weiterghender Abwasserreinigung, Korrepondenz Abwasser, Feb. 1991, pp. 247–254.
Korrespondenz Abwasser 36, Jahres–Inhaltsverzeichnis 1989, pp. 181–189.
Korrespondenz Abwasser 34 (1987), Unwandlung und Elimination von Stickstoff im Abwasser Arbeitsbericht der ATV–Fachausschüsse 2.6 und 2.8, pp. 77–85 and pp. 167–171.

(List continued on next page.)

*Primary Examiner*—Thomas G. Wyse
*Attorney, Agent, or Firm*—Jones, Tullar & Cooper, P.C.

[57] ABSTRACT

Described is a two-stage sewage treatment plant (10), in particular for domestic sewage, wherein the first biological purification stage (12) is dimensioned so that besides the carbon load, the mean nitrogen load is maximally degraded. Any peak loads that may appear are degraded in the second biological purification stage (13). This makes possible a space-saving construction and an economical operation. The second biological purification stage (13) is always a two-stage filtering installation with a filter stage (20) for nitrification and a filter stage (21) for denitrification. The first biological purification stage (12) can be an activated sludge stage as per A 131, a pure oxygen activated sludge or likewise a two-stage filtering installation.

12 Claims, 4 Drawing Sheets

OTHER PUBLICATIONS

Fachkolloquium vom 16. Feb. 1989 der Universitaät GH–Siegen. J. Hoffmann. Pilotversuche für ein–und zweistufige Simultanfällung (zur P–Elimination).

Conference Nice vom 4–6. Apr. 1989. Recents Developments Technologiques Dans les Reacteurs a Cultures Fixees. Technical Advances in Biofilm Reactors.

Antrag. vom 17. Mar. 1988 Auf Gewährung einer Bundeszuwendung für das Vorhaben "Biofiltration mit anschliessender UV–Bestrahlung zur weitergehenden Abwasserreinigung nach biologischer Vorrichtung".

GWF Wasser Abwasser. Untersuchungen zur Bedeutung der Säurekapazität bei Belebungsanlagen mit Nitrifikation und Simultanfällung. pp. 229–234.

METHOD FOR SEWAGE TREATMENT

FIELD OF THE INVENTION

The present invention relates to a method for sewage treatment, in particular for municipal sewage, with a mechanical purification stage and a first and second biological purification stage, in which the second biological purification stage is a biological filter system, which has a filter stage for nitrification and a filter stage for denitrification connected behind it in the flow direction, and with the filter stages having at least one biological filter.

BACKGROUND OF THE INVENTION

One such method is known from German Patent Disclosure DE 39 33 513. The first biological purification stage contemplated there involves two series-connected light load activation basins, which are followed—as a second biological purification stage—by a biologically intensified filter system for nitrification and denitrification. This addition of the filters that form a second biological purification stage for nitrification and denitrification is intended to reduce both the space and area requirement of the preceding light load activation stage and at the same time to reduce microscopic contaminants in the discharge (see DE 39 33 513 A1, column 2, lines 18–24 and column 3, lines 49–53). DE 39 33 513 A1 refers expressly to a patent application, filed shortly before it, of the same applicant and inventor, namely DE 39 16 679 A1 (see DE 39 33 513 A1, column 2, line 6). In it, it is also stated that the first biological purification stage is a light load activation stage; in DE 39 16 679 A1, it is then also stated in conjunction with an example (column 4, lines 57) that the nitrogen load is reduced down to a content of 10 mg/l.

The term light load activation stage is understood to mean a plant having a sludge burden of less than 0.1 kg of BSB/kg of sludge per day. This is a conventional term in this profession (see Degredmont *Handbuch Wasseraufbreitung Abwassereinigung* [Degrdmont's Manual of Water Purification and Sewage Treatment], Bauverlag Wiesbaden and Berlin, page 344).

If this understanding of the term "light load activation stage", as used in DE 39 16 679 A1 and DE 39 33 513 A1 and a reduction of the nitrogen load to a maximum of 10 mg/l (as indicated in DE 39 16 679, see column 4, line 57) is the point of departure, then, from calculations familiar to one skilled in the art, it can be found that the first biological purification stage is still relatively large, being designed namely for an impact factor of $f_N > 1$. These calculations are written down in the wastewater/refuse regulations of the *Abwassertechnische Vereinigung e.V.* (ATV) [Sewage Technology Association, a registered German association] in cooperation with the *Verband kommunaler Stadtereinigungsbetriebe* (VKS) [Association of Municipal Purification Plants], *Arbeitsblatt* [Newsletter] A 131, February 1991. The result $f_N > 1$ means that in the first stage, more than the 24-hour mean value of the load has been reduced. Peak loads in the discharge of 10 mg/l of $NH_4-N$, as indicated in the above publication, represent mean values of at most 3 mg per liter. Because of the fact that this value is so low, it follows that the light load activation stage is already designed for adequate nitrification. Such a size is necessary if one wants to keep the BSB load correspondingly low. However, if one were to dispense with designing the light load activation stage such that it reduces the peak loads, then this would have to be done at the cost of having a higher residual nitrogen load in the discharge.

Hence a disadvantage of this design is that the first biological purification stage requires a very great deal of space and surface area. In particular, it must be relatively large because currently the goal is very low maximum values in the discharge even at peak loads or in other words loads that are above the daily average value (24-hour average).

Another disadvantage of the known arrangement of DE 39 16 679 A1 is that within the first filter stage, nitrification must be converted into denitrification. The various biocenoses inside the filter can mix. A filter of this kind is hard to operate for process technical reasons, since no oxygen can be present in the denitrification stage.

SUMMARY OF THE INVENTION

The object of the present invention is to improve the plant of the kind mentioned above so that the space requirement is reduced. In addition, the other disadvantages described above should be prevented.

This object is attained according to the present invention in that in the first biological purification stage, the carbon load and in addition the nitrogen load occurring on a 24-hour average (nitrogen impact coefficient $f_N=1.0$) at the measurement temperature is reduced, and in the second biological purification stage the nitrogen load that exceeds this, an in particular the daily peaks ($f_N>1.0$) are reduced to a predeterminable extent, even at low temperatures (<12° C.).

For quantification of the nitrogen load, the following is accordingly understood:

The daily nitrogen load of the raw sewage is recorded and averaged over 24 hours. The conversion capacities of the biological purification stages are empirical values. The concentration of the nitrogen load on the 24-hour average is calculated from daily load and hydraulic throughput. Within a day, though, there are sometimes considerable load fluctuations around this average value. According to A 131, there is a so-called nitrogen impact factor $f_N$, which is defined as the ratio of the maximal two-hour nitrogen load to the average nitrogen load. According to the present invention, this impact factor fluctuates from 1.5 to 2.5, depending upon the connection size.

The first biological purification stage is therefore dimensioned maximally for an impact factor $f_N=1$. According to A 131, the dimensioning is carried out via the required sludge maturity, which in turn is a function of the measurement temperature and the size of the activation tank.

This optimization of the two purification stages produces an extremely compact construction so that according to A 131, the space savings is up with 50% in comparison to a single-step plant. In addition, the plant according to the present invention has great process stability. This stable process control is possible because the filter stages are completely de-coupled and each filter stage performs only one clearly defined task. In this way, a mixing of the biocenoses is also prevented.

At the same time, the purification capacity of the plant according to the present invention meets strict governmental requirements. Because of the extensive nitrification, the discharge concentration of $N_{inorg}$ can be set at the desired measure by the metered quantity of the external carbon source in the subsequent denitrification stage. Thus less than 5 mg/l for $N_{inorg}$ in the discharge can be achieved. Furthermore, CSB elimination, elimination of suspended particles, and germ reduction are improved. Due to the precise dimensioning of the two purification stages, these favorable discharge values are produced even with fluctuating untreated water data, i.e. peak loads occurring during the course of the day are reliably reduced. On the whole, this means better adaptation to the local situation and to the course of the load over the course of the day, with a minimized space requirement of the plant.

A further advantage of the plant according to the present invention is the rational use of resources. The filters are operated in an upward flow, i.e. the sewage to be treated flows upward from beneath and in a co-current flow with the processing air or the carbon source, through the filter stages. That leads, for example, to an improved $O_2$ use (up to 40–50%). In this way, the plant according to the invention has a low energy requirement, which leads to lower operational costs. Because of the reliable favorable discharge values, the present financial burden from sewage output is additionally reduced.

Advantageously, the precipitation and flocculation of phosphates is provided upstream of one of the filter stages or alternatively also upstream of both filter stages. Precipitation and flocculation can be carried out in a coagulation chamber disposed upstream of the biological filter or in the form of a tube coagulation, i.e. in the inlet line. Depending upon sewage composition, the metered precipitant added can alternatively be an iron or aluminum compound, preferably a basic aluminum compound. Depending upon sewage composition, a metered addition of acid can be provided upstream of the addition of precipitant to optimize the alkaline precipitant requirement. The flocculated phosphate is retained by the filters. Thus phosphate elimination is brought about in the filter system. The use of a basic precipitant is advised to increase the acid capacity in order to improve nitrification conditions. These measures can correct pH values, which are either too low or too high.

The filter stages preferably have a plurality of biological filters connected in parallel. This modular construction makes it possible to adapt the operation of the plant to the sewage flow. For example with a dry weather water influx (½–⅓ of the rainy weather water influx), one or a plurality of filters can be switched off. This leads to a further reduction of operating costs.

A further advantageous embodiment form is an additional denitrification system inside the first biological purification stage and the additional recirculation of a part of the $NO_3$ produced in the first filter stage. This is recommended because in the first biological purification stage, the carbon source for the denitrification is still contained in the sewage, while in the second biological purification stage it has to be supplied.

A further advantageous improvement is the optimization of waste rinsing water treatment. Waste rinsing water can either be sent to preliminary sedimentation upstream of the entire plant, or it can be separately treated, e.g. by means of flotation. In order to relieve strain on the line of treatment stages, then it is conducted upstream of a filter stage. Thus the plant is not so hydraulically loaded as when recycling for preliminary sedimentation.

If the rinsing water is removed from the clarified water of the first filter stage, then the treated waste rinsing water is used to replenish the inflow to the second filter stage so that it is evenly loaded. This type of operation is called storage tank operation.

The reduction in the phosphate and CSB load can be further improved in a preceding mechanical purification stage, in which these contents are removed by precipitation/ flocculation and sedimentation.

According to A 131, the first biological purification stage can be a light load activation stage dimensioned according to the dimensioning rules according to the present invention.

It is particularly advantageous to also equip the first biological purification stage with biological filters. In this kind of compact plant, additional biological filter stages fulfill the purpose of conventional activation tanks. According to A 131, the space requirement can be reduced by up to 75% compared to a conventional plant. In addition, pollution (in the form of odor or noise) is markedly reduced by means of the closed structure of the reactors.

If a denitrification system with $NO_3$ recirculation in the form of a filter stage is provided in the first biological purification stage, this system can be advantageously designed so that it has a lower, anaerobic zone with untreated water influx for biological phosphate decomposition and an upper, anoxic zone with $NO_3$ influx for denitrification.

A further advantageous improvement of this filter stage provides that both zones can be alternatively ventilated and the entire filter stage can consequently be converted to aerobic carbon decomposition. That is advantageous for example if the recirculation must be shut off when there is increased rain water influx in order to not exceed the permissible flow velocity in the filter stage.

The biological filter of a filter stage of this kind has a tuyere bottom upon which granular filter material is poured. The untreated water influx is disposed beneath the tuyere bottom and a processing air distributor, which has processing air nozzles for furnishing oxygen and can be alternatingly switched on, is disposed above the tuyere bottom. Further above the tuyere bottom, the $NO_3$ inflow feeds into a recirculation distributor, which is disposed alternatively on the tuyere bottom or higher up in the filter material.

The biological filter according to the present invention can be operated so that the zone beneath the recirculation distributor is anaerobic and the zone above it is anoxic so that phosphates or nitrates respectively are biologically decomposed. The biological filter can also be ventilated beginning at the tuyere bottom and hence aerobically operated so that phosphates as well as the carbon load of the sewage can be biologically decomposed.

In the following, two exemplary embodiments of the plant according to the present invention as well as an exemplary embodiment of the biological filter according to the present invention are described with reference to the accompanying drawings.

DESCRIPTION OF THE PREFERRED EMBODIMENTS

Figure 1:
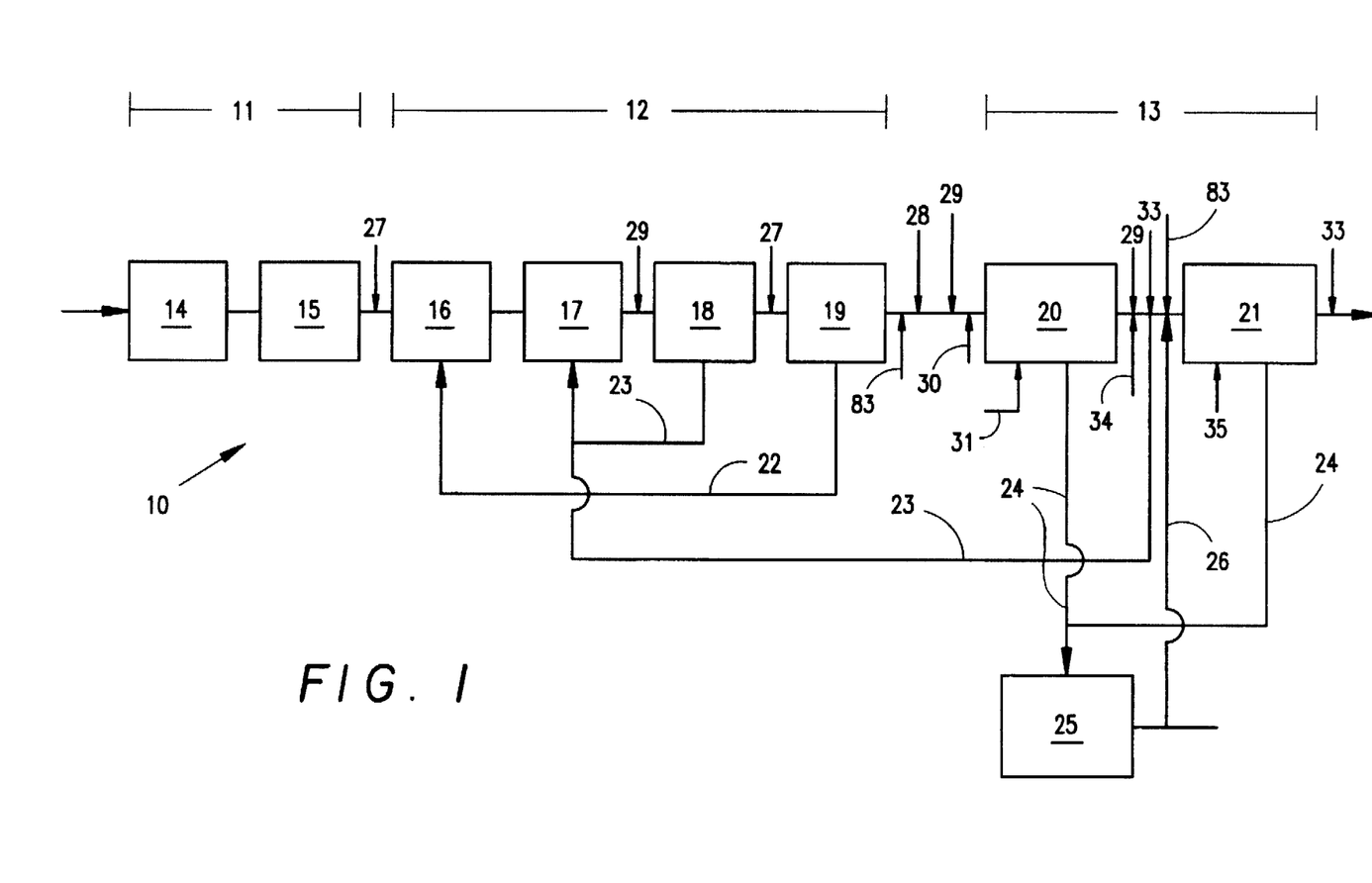
FIG. 1 schematically represents a first exemplary embodiment of a sewage treatment plant according to the present invention.

The plant 10 shown in FIG. 1 is composed of a mechanical purification stage 11, a first biological purification stage 12 and a second biological purification stage 13. The mechanical purification stage 11 comprises a screen with a sand catcher/grease trap 14 and a detritus chamber 15. The preliminary sedimentation, however, can also be carried out in another manner, e.g. by a diagonal honeycomb clarifier.

The first biological purification stage 12 is a conventional activation stage according to A 131, which is dimensioned for an impact coefficient of $f_N=1$, with an activation tank 16 for anaerobic biological phosphate decomposition, a denitrification tank 17 for anoxic $NO_3-N$ and carbon decomposition, an activation tank 18 for the aerobic $NH_4-N$ and carbon decomposition, and a final sedimentation tank 19. The activation tank 16 and the denitrification tank 17 are not compulsory. From the final sedimentation tank 19, the removed return sludge is conducted via a line 22 back into the activation tank 16. Some of the nitrate-containing discharge of the activation tank 18 is recirculated via a line 23 to the denitrification tank 17.

The final sedimentation tank 19 is adjoined by the second biological purification stage 13, which comprises a first filter stage 20 for aerobic nitrification and a second filter stage 21 for anoxic denitrification. The first filter stage 20 is supplied with processing air via line 31. The second filter stage 21 is charged with methanol via line 35. A part of the nitrate-containing discharge of the first filter stage 20 is recirculated to the denitrification tank 17 via line 23. In addition, lines for filter rinsing water and filter rinsing air, which are not shown in FIG. 1, feed into both filter stages 20, 21. The waste rinsing water produced when backrinsing is drained via a line 24 and separately purified in 25 by means of flotation. The purified waste rinsing water is supplied via a line 26 to the inlet of the second filter stage 21.

Each filter stage 20, 21 comprises six biological filters 70 connected in parallel. A biological filter 70 of this type is shown more precisely in FIG. 3.

Figure 3:
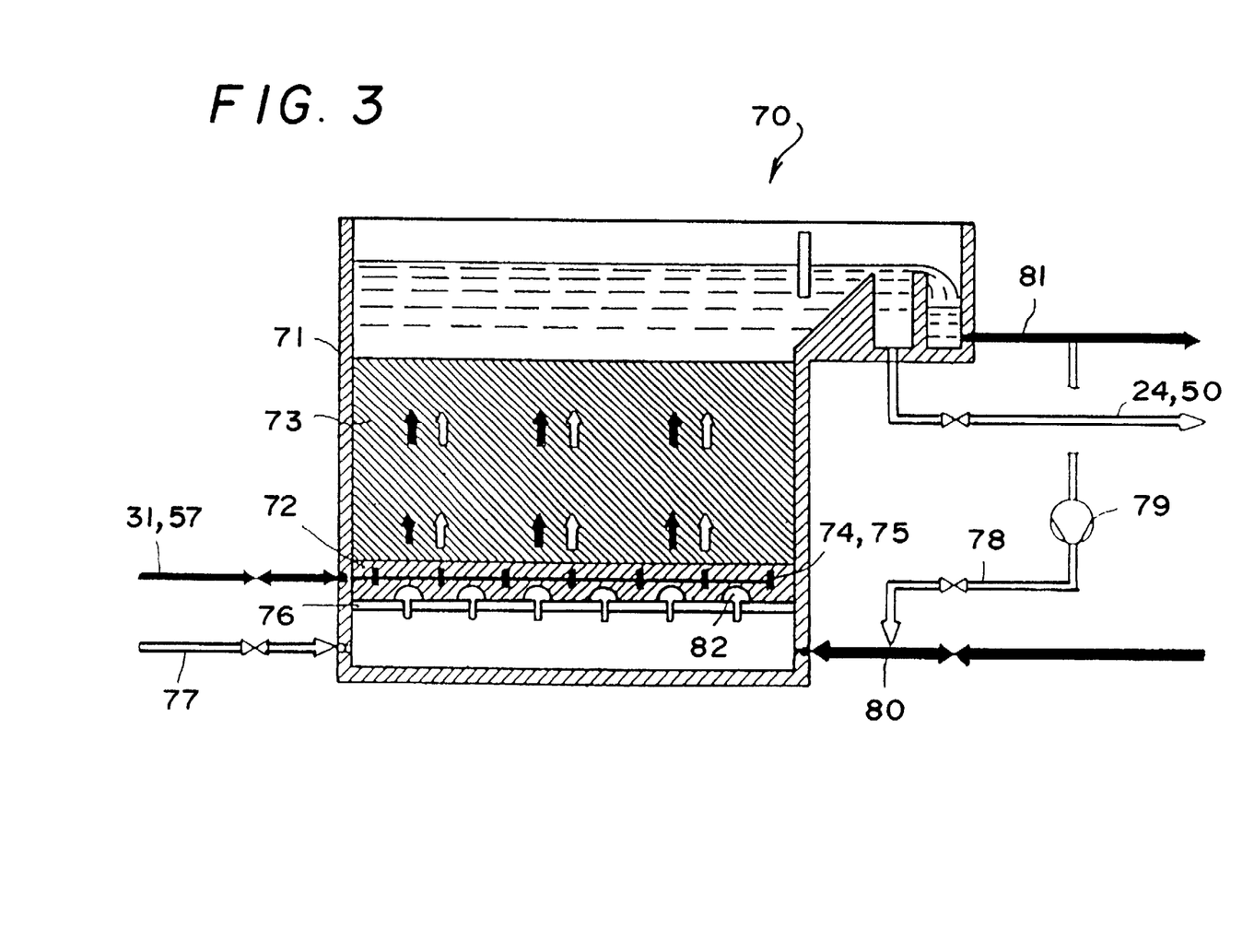
FIG. 3 shows a biological filter in detail.

In a housing 71 on a tuyere bottom 76, a granular, swelling clay with a grain spectrum of 3–6 mm is poured as a filter material 73 up to a poured level of 4 m. However, other clays, basalts, lavas, quartz sands, or activated charcoals with a particle size of approximately 1–8 mm are also suitable. A suitable filter material 73 is abrasion resistant and has a sufficient specific gravity (1.5 g/cm$^3$) as well as a large specific surface area. The filter material 73 is disposed on a two-stage, stepped supporting gravel layer 72. Directly on the tuyere bottom lies an approximately 15 cm high supporting gravel layer with a particle size of 16–32 mm; on top of this lies an approximately 15 cm high supporting gravel layer with a particle size of 8–16 mm, and on top of this lies the actual filter material. A processing air distributor 74 with processing nozzles 75 (trademark "Oxazur") is set into the support gravel layer 72, directly on the tuyere bottom 76. 25–50 nozzles/m$^2$ are provided. Rinsing nozzles 82 are screwed into the tuyere bottom 76 itself, actually 50–60 nozzles/m$^2$.

The biological filter 70 is operated in a downward flow The untreated water from the raw sewage inlet 80 and the processing gas or the carbon source from line 31 or 57 are disposed in co-current flow.

The encrustation of the filter material 73 is regulated by the limit conditions; that is, depending on the type of operation (oxygen content, pH, organic carbon source, etc.), a selection pressure is exerted, which encourages the growth of a desired biocenosis. The microorganisms are partially rinsed out of the final sedimentation tank 19, enter the biological filter 70 at the inlet, and remain caught in the filter material 73. Since microorganisms always are also in the inlet, the biocenosis is flexible and can be adapted to altered conditions.

In the first filter stage 20, the carbon-load cannot be too high because otherwise its capacity is reduced. Oxygen must be present for nitrification. The air charge is set at a velocity of 4–15 m/h according to the theoretical oxygen demand, which can be calculated stoichiometrically. The oxygen efficiency is exceptionally high and is up to 40–50%. The oxygen supply may only be interrupted for short times when the filter is operating; otherwise the nitrificants can be damaged.

Typically the carbon load in the inlet of the second biological purification stage 13 is approximately 20–60 mg BSB$_5$/l. The oxygen transfer is between 55 and 80 g O$_2$/Nm$^3$, which corresponds to an efficiency of 20–50%.

The establishment of limit conditions is subject to a certain self-regulation. Normally the fluctuation range that is optimal for the microorganisms prevails. This range is established on its own.

However, with extreme fluctuations, e.g. of the pH value, an intervention is made from outside, although normally in the first biological purification stage 12. If necessary, naturally one can also intervene before the first filter stage 20, e.g. if the acid capacity (carbonate hardness) in the inlet is insufficient, in order to guarantee complete nitrification at an available NH$_4$–N load; then a pH correction with lime, carbonate, or NaOH is advised. Another possibility is to use an alkaline precipitant, e.g. Na-aluminate, for the precipitation of phosphates. With municipal sewage, though, as a rule the acid capacity is sufficient.

The temperature is not regulated at all, but it is accepted that the microorganisms are less active in winter.

However, it is assumed that the immobilized microorganisms are somewhat less temperature sensitive than the microorganisms suspended in the activation tank. Operating temperatures of <10° C. are also acceptable.

The action of the biological filter 70 is thus based on the one hand upon a classic filtration action (solids retention), and on the other hand upon nitrification or denitrification by the biomass immobilized on the filter material 73. At the same time, in nitrification, the residual carbon that still runs into the filter is decomposed.

The nitrification capacity is typically about 0.5–1.5 kg NH$_4$–N$_{ox}$/m$^3$d, but can also be above that. That depends upon local conditions, in particular upon the sewage quality. The NH$_4$–N content in the discharge is approximately lower than 2 mg/l, regardless of fluctuations depending on the time of day.

The biological filters 70 of the filter stages 20, 21 are regularly rerinsed at predetermined times or when there is a loss of pressure, or clouding. The rinsing takes place completely automatically with programmable control. A time period is set, usually from 24–72 h. If in this time, pressure loss of the filter has not exceeded a limit value, rinsing is not done until the time period has elapsed. If, however, pressure loss or clouding in the biological filter 70 exceeds a limit value, then it is taken into backwashing once it exceeds this value.

All of the biological filters 70 of a filter stage 20, 21 are never rinsed at the same time in order not to interrupt the water flow.

The rinsing is a combined air/water rinsing with a subsequent clarifying rinsing. The rinsing air is supplied via line 77. The rinsing water is supplied to the untreated water inlet 80 by a pump 79 via line 78. The rinsing water as a rule is taken from the discharge of the second filter stage. The consumption is about 3–8% of the outflowing clarified water, that is, 7–10 m$^3$/m$^2$. It comprises the process steps of rapid decomposition, loosening, air/water rinsing, and clarifying rinsing.

Returning now to FIG. 1, it is clear that in the exemplary embodiment, the precipitant addition 29 for residual phosphate precipitation occurs in the inlet to the activation tank 18 and to the first filter stage 20. An acid addition 83 is respectively provided by the first filter stage 20 and the second filter stage 21. The metered precipitant added can alternatively be an iron or aluminum compound. The flocculated phosphate can be removed, or retained by the filter material 73. In order to achieve for example Ptotal discharge values of <0.8 mg/l, approximately 3–4.5 mg $Fe^{3+}$/l are used at inlet values of 1.5 mg/l.

The discharge of the first filter stage 20 is supplied to the second filter stage 21. The load is about 50 mg nitrate/l. The second filter stage 21 is constructed like the first filter stage 20, with the exception that it is not ventilated, but is charged with a carbon source via line 35. About 2.5 kg methanol/kg $NO_3$–N is supplied as the carbon source. Other carbon sources such as ethanoic acid or ethanol are also suited, as well as products from sludge treatment or cloudy water.

In the discharge of the second filter stage 21, no ammonium formation by nitrate ammonification is observed. In addition nitrite formation is observed only at the beginning of the startup phase. Later, the nitrite formers may be overgrown by the denitrificants, and hardly any further nitrite formation is observed.

The denitrification capacity is up to 2–5 kg/$m^3$d. 1–7 mg/l $NO_3$–N is observed in the discharge.

The suspended particle content in the discharge of the second filter stage 21 is less than 10 mg/l and remains this low even with a flow velocity of up to 10–12 m/h. The germ count is reduced for example from $5.10^6$/ml to $5.10^5$/ml in the first filter stage 20 and further reduced down to $1.10^5$/ml in the second filter stage 21.

Furthermore, the following measuring arrangements for controlling operational discharge can be seen in FIG. 1. An $NH_4$–N measurement 30 takes place in the inlet of the first filter stage 20. The processing air supply 31 is controlled in this way, in connection with a through flow measurement not shown. Furthermore a P measurement 28 takes place, with which the precipitant addition 29 is controlled. An $NO_3$ measurement 34, which controls the methanol supply 35, takes place in the inlet of the second filter stage 21. The through flow measurement furthermore controls the switching on and off of individual biological filters 70; a pressure measurement, likewise not shown, under the tuyere bottom 76 of the biological filter 70, together with a turbidimetry 33 in the discharges of both filter stages 20, 21 controls the rinsing.

The $NH_4$–H and P measurements can naturally also take place in the discharge of the first filter stage 20.

Thus the plant 10 can be economically operated. The filter run time can also be influenced via integration calculation. If the load capacity of a biological filter 70 is known, then the time after which the filter must be rinsed is known quite precisely. Thus the time predetermination of the rinsing can be optimally set.

Figure 2:
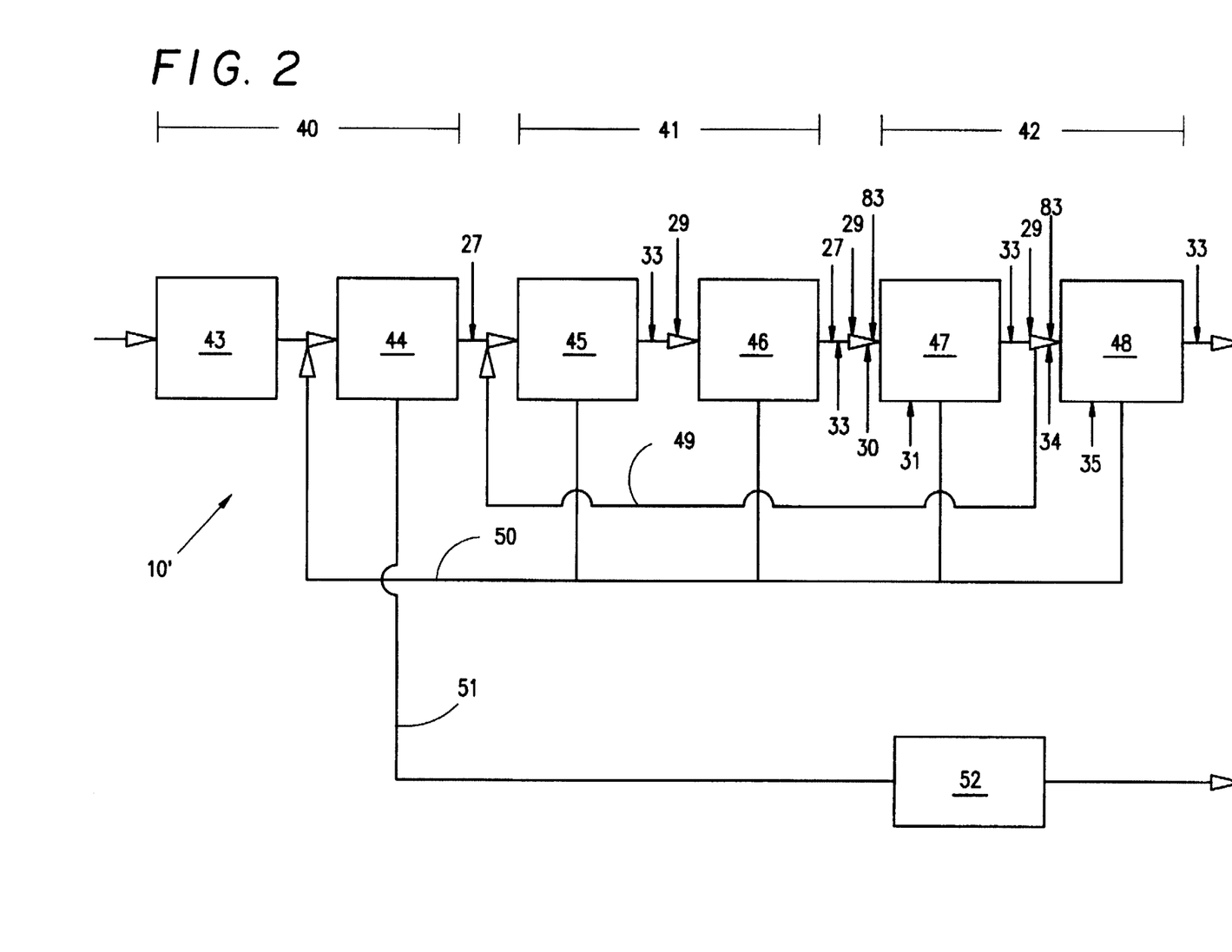
FIG. 2 schematically represents a second exemplary embodiment of a sewage treatment plant according to the present invention.

FIG. 2 shows a second exemplary embodiment of a plant 10' according to the present invention. This plant also has a mechanical purification stage 40, a first biological purification stage 41, and a second biological purification stage 42.

The mechanical purification stage 40 comprises a screen with a sand catcher/grease trap 43 and a precipitation, flocculation, and sedimentation unit 44, in which CSB and phosphates are precipitated, flocculated, and sedimented. Here, the latter is a diagonal honeycomb clarifier, which vertically divides into three zones: metered addition of precipitation chemicals, flocculation, and sedimentation in a honeycomb-shaped insert. The incident sludge is removed via line 51 and supplied to a separate treatment 52. The hydraulic load of this stage can be up to 20 m/h.

A sedimentation stage 44 of this kind is advantageous when there is little space available since it is more compact than a classic preliminary sedimentation.

Naturally, instead of this a detritus chamber and/or an activation tank can also be provided for biological phosphate, decomposition. It is important that a preliminary sedimentation is done at all.

In the first biological purification stage 41, the activation tanks of the conventional activation stage are replaced by corresponding filter stages 45, 46. The construction of these filter stages is fundamentally described like that of the filter stages 20, 21 of the first exemplary embodiment.

The first filter stage 45 corresponds in its function to the denitrification tank 17. Carbon and nitrates are decomposed in parallel. Nitrates from the discharge of the subsequent nitrification filters are recirculated via a line 49. The recirculation must be turned off when the untreated water influx becomes too great, e.g. when there is rainy weather, in order to not exceed the permissible flow velocity of 2–11 m/h in the filter stage 45. That is why a flow measurement, not shown, is provided in the inlet for control.

The biological filters of the filter stage 45 are constructed as described above. They can, however, also be constructed as shown in FIG. 4.

Figure 4:
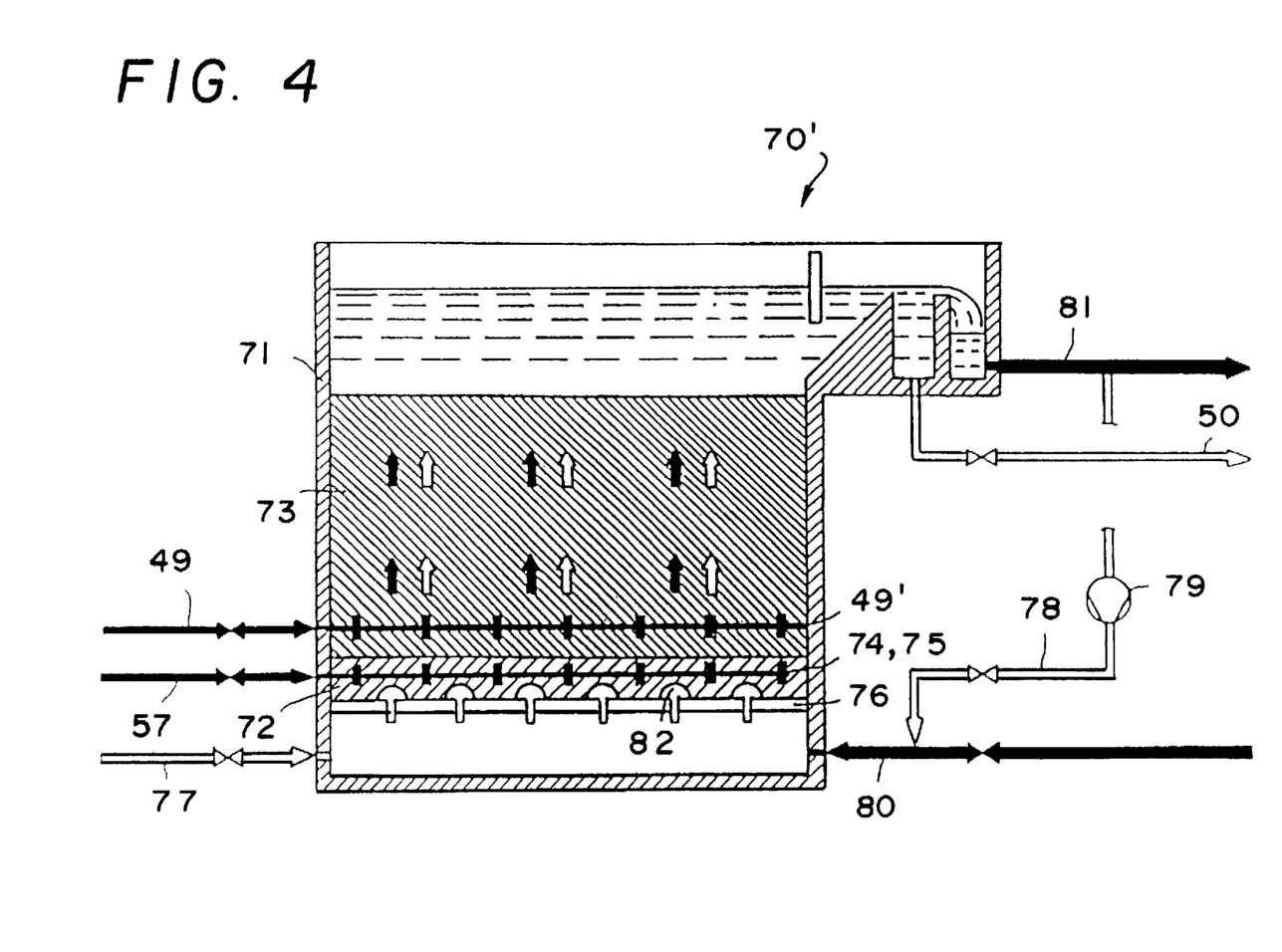
FIG. 4 shows an alternatingly operable biological filter according to the present invention.

In contrast to the already described biological filter 70, the biological filter 70' shown in FIG. 4 additionally has a recirculation distributor 49', which is embedded in the filter material 73. The untreated water supply 80 and the rinsing air supply 77 are disposed beneath the tuyere-bottom 76. The processing air supply 57 is disposed above the tuyere bottom 76. When this is switched off and the nitrate supply 49 is open, the region between the tuyere bottom 76 and the recirculation distributor 49' is anaerobic, and the region above the recirculation distributor 49' is anoxic so that denitrification takes place. If the processing air supply 57 is open and the nitrate supply 49 is closed, then the entire biological filter 70' is aerobic, and carbon and phosphates are biologically decomposed. The biological filter 70' is thus alternatingly operated.

The second filter stage 46 of the first biological purification stage 41 corresponds to the activation tank 18. The carbon still present is decomposed. Parallel to that, the nitrification is started. The second filter stage 46 is constantly ventilated.

The filter stage 46 is adjoined by the second biological purification stage 42, which corresponds in construction and function to the second biological purification stage 13 of the first exemplary embodiment. The remaining $NH_4$–N is nitrified into $NO_3$–N in the first filter stage 47. Here too, there is a recirculation 49 to the inlet of the filter stage 45. The recirculation is controlled as described, depending upon the incoming water quantity. The conversion of $NO_3$–N to $N_2$ takes place in the second filter stage 48.

The backwashing of the biological filters 70, 70' takes place as described above. The filter rinsing water is conducted via line 50 to the head of the plant 10', that is, to the sedimentation stage 44. However a separate treatment, e.g. by flotation, is also conceivable, as well as storage tank operation.

The plant 10' essentially has the same measurement devices as the plant 10 of the first exemplary embodiment.

Reference is made to that description. The same measurement devices have the same reference numerals.

In summary, it must be emphasized that with optimal dimensioning, the sewage treatment plant 10, 10' according to the present invention requires 40–75% less space than a one-stage activation system according to A 131, with comparable purification aims. The purification capacity of the various filter stages is very good, regardless of fluctuations depending on the time of day, and is 4–7 kg/m$^3$ for solids load, 6 kg/m$^3$d for BSB decomposition, 12 kg/m$^3$d for CSB decomposition, 1–1.5 kg/m$^3$d for nitrification, and 2–2.5 kg/m$^3$d for denitrification, at a measurement temperature of 10° C.

The purification capacity of the plant according to the present invention permits discharge values of:

| | | |
|---|---|---|
| $N_{inorg}$ | < | 5 mg/l, |
| BSB | < | 10 mg/l, |
| AFS | < | 10 mg/l, |
| CSB | < | 50 mg/l, |
| $P_{total}$ | < | 0.8 mg/l. |

We claim:

1. A method of sewage treatment, and in particular municipal sewage, comprising the steps of:
   providing a mechanical purification stage, followed by a first biological purification stage and a second biological purification stage in the form of a biological filter system including a nitrification filter stage and a denitrification filter stage;
   reducing in the first biological purification stage the carbon load and, as a maximum, the average nitrogen load occurring in 24-hours; and
   reducing in the second biological purification stage the nitrogen load peaks which exceed the average nitrogen load occurring in 24-hours including at temperatures below 12° C.

2. The method as defined in claim 1, further comprising the step of:
   eliminating phosphate by precipitation in the second biological purification stage.

3. The method as defined in claim 1, further comprising the step of:
   eliminating phosphate by flocculation in the second biological purification stage.

4. The method as defined in claim 1, further comprising the step of:
   eliminating phosphate by precipitation and flocculation in the second biological purification stage.

5. The method as defined in claim 1, further comprising the step of:
   forming the filter stages by parallel-connected biological filters.

6. The method as defined in claim 1, further comprising the steps of:
   conducting denitrification in the first biological purification stage; and
   returning a part of the discharge of the first filter stage of the second biological purification stage into the denitrification system.

7. The method as defined in claim 1, further comprising the step of:
   rinsing the filter stages of the second biological purification stage; and
   separately purifying the rinsing water obtained when the filter stages of the second biological purification stage are rinsed.

8. The method as defined in claim 1, further comprising the step of:
   eliminating phosphate and COD by precipitation in the mechanical purification stage.

9. The method as defined in claim 1, further comprising the step of:
   eliminating phosphate and COD by flocculation in the mechanical purification stage.

10. The method as defined in claim 1, further comprising the step of:
    eliminating phosphate and COD by precipitation and flocculation in the mechanical stage.

11. The method as defined in claim 1, wherein the first biological purification stage comprises a pure oxygen activation system.

12. The method as defined in claim 1, further comprising the step of:
    operating the first biological purification stage, which serves as a biological filter, in an upward flow which carries out both a chemical/physical and a biological purification, wherein the first biological purification stage has at least one filter stage for denitrification and carbon decomposition, and at least one filter stage for carbon decomposition and nitrification, and wherein the denitrification and carbon decomposition filter stage and the carbon decomposition and nitrification filter stage have at least one biological filter.

* * * * *